United States Patent [19]

Kabe et al.

[11] Patent Number: 4,800,941
[45] Date of Patent: Jan. 31, 1989

[54] HEAVY LOAD RADIAL TIRE

[75] Inventors: Kazuyuki Kabe, Hiratsuka; Ken Takahashi, Atsugi; Masashi Kida, Chigasaki; Saichi Harada, Hiratsuka, all of Japan

[73] Assignee: The Yokohama Rubber Co., Ltd., Tokyo, Japan

[21] Appl. No.: 38,572

[22] Filed: Apr. 15, 1987

[30] Foreign Application Priority Data

May 8, 1986 [JP] Japan .................. 61-103893

[51] Int. Cl.[4] .................................. B60C 9/18
[52] U.S. Cl. ..................... 152/531; 152/535; 152/538
[58] Field of Search ............ 152/531, 535, 538, 560, 152/209 R

[56] References Cited

U.S. PATENT DOCUMENTS

| 2,884,040 | 4/1959 | Boussu et al. | 152/531 X |
| 2,947,339 | 8/1960 | Billingsley | 152/535 X |
| 2,958,359 | 11/1960 | Boussu et al. | 152/531 |
| 3,195,604 | 7/1965 | Boussu et al. | 152/535 |
| 3,842,884 | 10/1974 | Bertrand | 152/538 X |

FOREIGN PATENT DOCUMENTS

| 52-44902 | 4/1977 | Japan | 152/538 |
| 60-50003 | 3/1985 | Japan . | |
| 60-234002 | 11/1985 | Japan . | |

Primary Examiner—Michael W. Ball
Assistant Examiner—Ramon R. Hoch
Attorney, Agent, or Firm—Armstrong, Nikaido, Marmelstein & Kubovcik

[57] ABSTRACT

A heavy load radial tire is disclosed, wherein a sub-carcass layer having a cord angle substantially equal to that of a carcass layer is disposed on the carcass layer, and at least one belt layer whose cords cross at right angles the cords of the sub-carcass layer is disposed on the sub-carcass layer.

2 Claims, 3 Drawing Sheets

HEAVY LOAD RADIAL TIRE

BACKGROUND OF THE INVENTION

This invention relates generally to an internal structure of a radial tire, and more specifically to a radial tire for heavy load which prevents belt edge separation.

Radial tires in general consist of a pair of right and left beads, a pair of right and left sidewalls connecting these beads and a tread disposed between the sidewalls. A carcass layer is fitted between the pair of beads and a belt layer is disposed on the tread in such a manner as to encompass the outer periphery of the carcass layer.

Steel or organic fibers such as nylon, polyester, and the like are used as the cord material for the carcass layer. Steel cords or aramide (aromatic polyamide fiber) cords are used as the cords of the belt layer.

I conventional radial tires, the cords of the carcass layer are disposed at about 90° with respect to the tire circumferential direction in order to let them exhibit a hoop effect for restricting the increase of the diameter of the tread, and the cords of the belt layer are disposed in a bias arrangement at a certain angle with respect to the tire circumferential direction.

In the belt structure having such a bias laminate form, however, inter-laminar shearing stress occurs at the end portion of the belt layer in the direction of its width with the use of the tire and so-called "belt edge separation" occurs.

Various counter-measures have therefore been taken in the past. For instance, an inter-laminar gauge is increased at the end portion of the belt layer to reduce the inter-laminar shearing stress (Japanese patent application Kokai publication No. 52-22202), and the width and shape of the belt line are selected in match with the carcass line to restrict the shearing strain at the end portion of the belt layer (Japanese patent application Kokai publication No. 52-44902). However, these methods have not yet been entirely satisfactory to prevent sufficiently the belt edge separation.

SUMMARY OF THE INVENTION

It is therefore an object of the present invention to provide a heavy load radial tire which sufficiently prevents the occurrence of the belt edge separation.

In a radial tire having at least one carcass layer whose cords are disposed at an angle of about 90° with respect to the tire circumferential direction, the
(1) a sub-carcass layer is disposed adjacent to the carcass layer on the tread surface side at a cord angle substantially equal to that of the carcass layer and in a width below 90% of a road contact width; and
(2) at least one belt layer whose cords cross the cords of the sub-carcass layer at right angles is disposed in the proximity of the sub-carcass layer on the tread surface side and the width of the belt layer adjacent to the sub-carcass layer is made greater than at least the width of the sub-carcass layer.

Incidentally, the term "road contact width" used herein means the road contact width under the normal condition of use (JIS design standard inflation pressure load).

The above and other objects of the present invention will become more apparent from the following detailed description when taken in conjunction with the accompanying drawings.

DESCRIPTION OF THE PREFERRED EMBODIMENT

Figure 3:
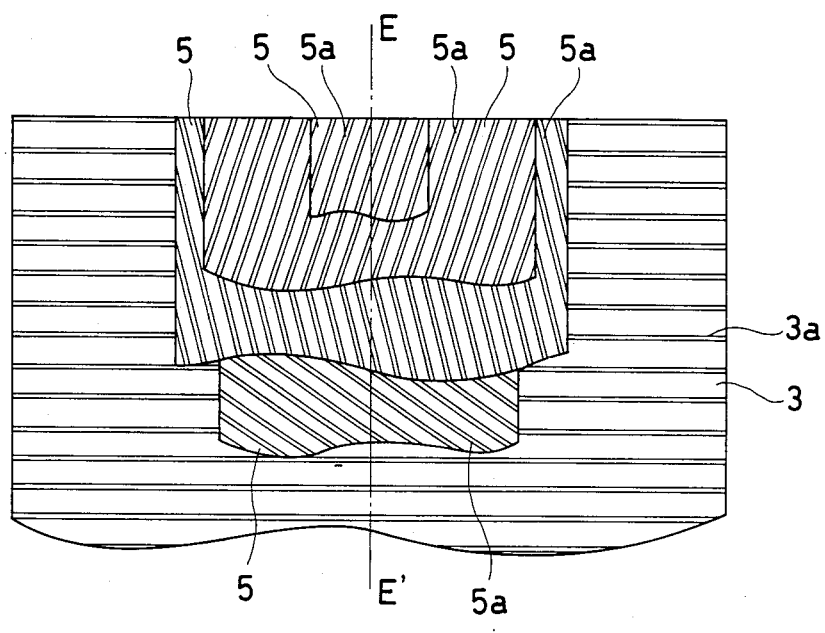
FIG. 3 is an explanatory plan view showing an example of the tread structure of a conventional heavy load radial tire.

In a conventional radial tire shown in FIG. 3, cords $3a$ of a carcass layer 3 are arranged in a tire sectional direction (in a direction at about 90° with respect to a tire circumferential direction EE') as shown in the drawing and the cords $5a$ of a belt layer 5 are laminated in a bias arrangement at a certain angle (generally from 20° to 60°) with respect to the tire circumferential direction EE'.

Figure 1:
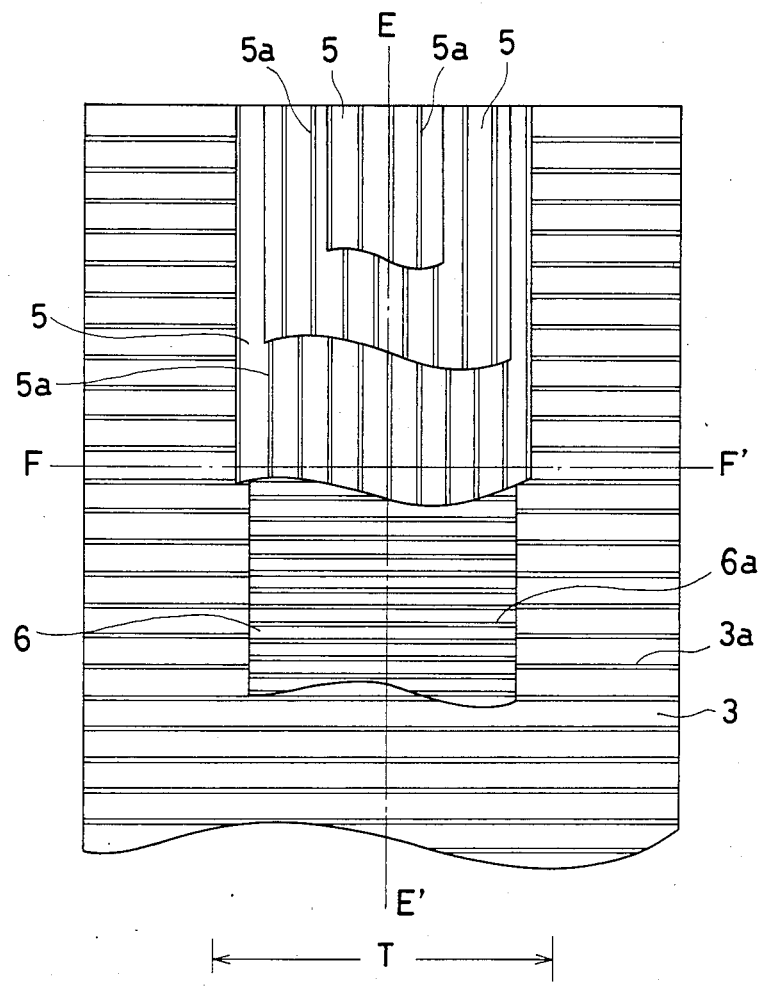
FIG. 1 is an explanatory plan view showing an example of the tread structure of a heavy load radial tire in accordance with the present invention.

In contrast, the radial tire in accordance with the present invention has a tread structure such as shown in FIG. 1. In this drawing, the cords $3a$ of the carcass layer 3 are arranged at about 90° to the tire circumferential direction EE'. This carcas layer 3 may be one or more layers.

(1) In the present invention, a sub-carcass layer 6 having a cord angle substantially equal to that of the carcass layer 3 is disposed adjacent to the carcass layer 3 on a tread surface side, that is, on the carcass layer 3, in a width up to 90% of the road contact width T, as shown in FIG. 1.

Here, if the width of the sub-carcass layer 6 is above 90% of the road contact width T, separation occurs at both end portions of the sub-carcass layer 6 in the direction of its width and tire durability deteriorate.

If the width of the sub-carcass layer 6 becomes too narrow, bending stiffness of tread region in a tire sectional direction can not be moderately maintained, therefore the width of the sub-carcass layer 6 may be above 50% of the road contact width T. For this reason, the width of the sub-carcass layer 6 may be from 50% to 90%, preferably from 65% to 85% of the road contact width. At least one sub-carcass layer 6 may be disposed.

On the tire tread surface (road contact zone), on the other hand, bending stiffness of the tread region must be balanced between the tire sectional direction FF' and the tire circumferential direction EE'. If this balance is not sufficient, problems occur on straight running stability and cornering response under vehicle running.

Since the carcass layer 3 alone does not keep the sufficient bending stiffness in the tire sectional direction FF' as described above, the sub-carcass layer 6 is disposed in order to reinforce the bending stiffness.

More specifically, if the cord angle of the sub-carcass layer 6 is substantially equal to that of the carcass layer 3 or in other words, if the cords $6a$ of the sub-carcass layer 6 are in parallel with the cords $3a$ of the carcass layer 3, the bending stiffness in the tire sectional direction FF' can be increased and straight running stability can be improved. To increase the bending stiffness, it is most effective to dispose the cords $6a$ of the sub-carcass layer 6 in the tire sectional direction FF' and this method provides another advantage in that the number of picking of cords of carcass layer 3 can be reduced. If the cord angle of the sub-carcass layer is substantially equal to that of the carcass layer 3, the tire structure has a so-called "orthogonal structure" and is free from so-called "structure singularity" [occurrence of characteristics (ply steer) singular to a tire structure] of the conventional tires.

(2) In the present invention, at least one belt layer 5 whose cords 5a cross at right angles the cords 6a of the sub-carcass layer 6 is arranged adjacent to the sub-carcass layer on the tread surface side and the width of the belt layer 5 adjacent to the sub-carcass layer 6 is greater than at least the width of the sub-carcass layer 6.

Here, the width of the belt layer 5 is made greater than that of the sub-carcass layer 6 in order to prevent separation at both end portions of the subcarcass layer 6 in the direction of its width and to improve durability.

The cords are arranged in the direction of principal axis of elasticity in order to prevent the occurrence of the inter-laminar shearing stress at both end portions of the belt layer in the direction of width. For this purpose, the cords of the carcass layer 3 and sub-carcass layer 6 are arranged in the tire sectional direction while the cords of the belt layer 5 are arranged in a direction orthogonal to the former, that is, in the tire circumferential direction EE'.

Since the belt layer 5 is disposed in the manner described above, it forms a so-called "orthogonal structure" with the sub-carcass layer 6 and can exhibit a sufficient hoop effect as the belt layer. At least one layer and preferably from 2 to 3 belt layers, are disposed.

The following will show an embodiment of the present invention.

EXAMPLE

Figure 2:
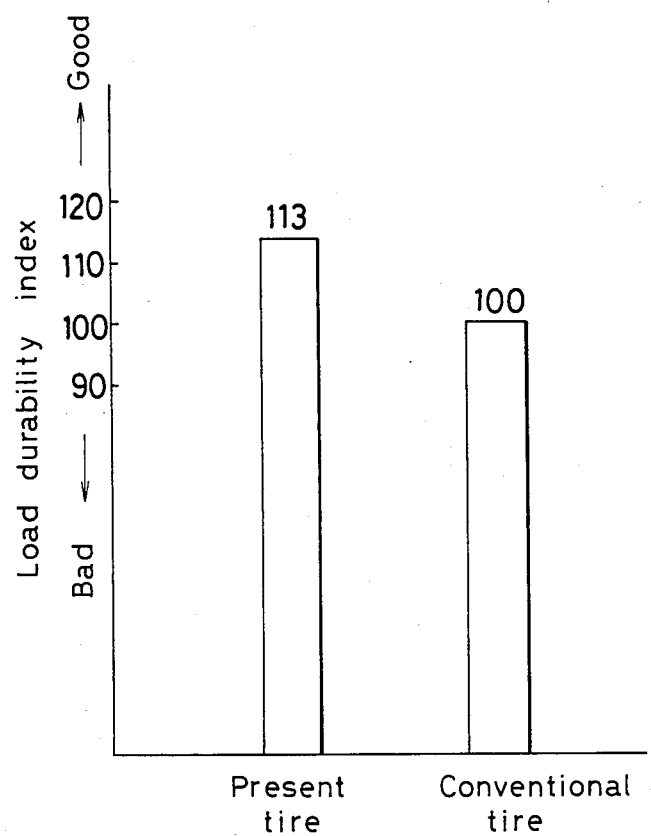
FIG. 2 is a diagram useful for explaining the load durability of the tire.

An indoor drum load durability test was conducted for each of the tire of the present invention and the conventional tire. The result is shown in FIG. 2 by indicies.

(a) Tire of the Invention

Tire Size: 10.00 R 20.

Carcass Layer: One steel cord layer, steel cords 3+9+15 (0.175 mm), full radial (angle 90°, tire circumferential direction).

Sub-carcass Layer: One steel cord layer, steel cords 3+9+15 (0.175 mm), width 160 mm, angle 90°.

Belt Layer: 3 steel cord layers, steel cords 1×12 (0.22), width 170 mm, 160 mm, 70 mm, angle 0°.

Others: Such as the structure, the tread rubber and so forth were the same as those used in ordinary heavy load radial tires.

(b) Conventional Tire

Tire Size: 10.00 R 20.

Carcass Layer: One steel cord layer, steel cords 3+9+15 (0.175 mm) full radial (angle 90°, tire circumferential direction).

Belt Layer: 4 steel cord layers, 1B [steel cords 3+6 (0.38), width 150 mm, angle 50°], 2B [steel cord 3+6 (0.38), width 180 mm, angle 20°], 3B [steel cord 3+6 (0.38), width 170 mm, angle 20°].

Others: Such as the structure, the tread rubber and so forth were the same as those used in ordinary heavy load radial tires.

Indoor drum load durability test

The test was conducted under the following test conditions using an indoor drum tester (drum diameter 1707 mm).

Test Conditions (in conformity to JIS durability test)
Inflation Pressure: $P = 7.25$ kg/cm$^2$
Speed: $V = 55$ km/hr
Load: 1760 kg The load was increased every 8 hours until breakage.

It can be understood from FIG. 2 that the tire of the present invention exhibits an improvement in the load durability by 13% when compared with the conventional tire.

The present invention described above can sufficiently prevent the problem of the belt edge separation in the conventional tires.

We claim:

1. A heavy duty radial tire having a tread portion and at least one carcass layer disposed inwardly of said tread whose cords are disposed at substantially 90° with respect to a tire circumferential direction, further comprising:
    (1) a sub-carcass layer having a cord angle substantially equal to that of said carcass layer disposed adjacent to and outwardly of said carcass layer on a tread surface side and having a width of from 50 to 90% of the road contact width of said tread surface; and
    (2) at least one belt layer whose cords cross at right angles the cords of said sub-carcass layer disposed adjacent to and outwardly of said sub-carcass layer on the tread surface said, the width of said belt layer adjacent to said sub-carcass layer being greater than the width of said sub-carcass layer.

2. A heavy duty radial tire as defined in claim 1, wherein the number of said belt layers is from 2 to 3.

* * * * *